E. THOMAS.
Churn.
No. 753.
Patented May 30, 1838.
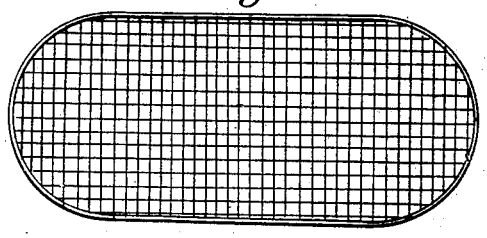
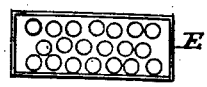
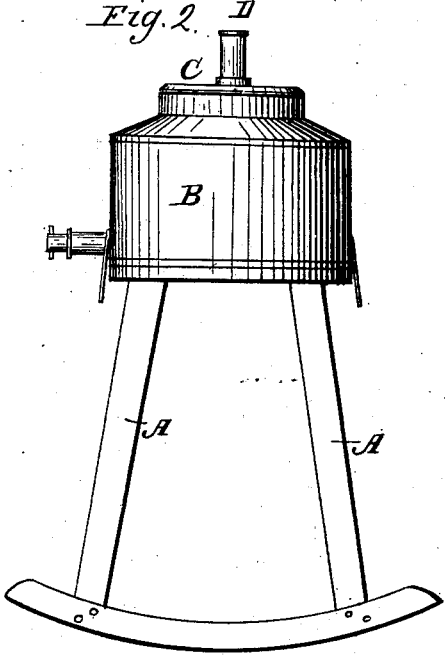
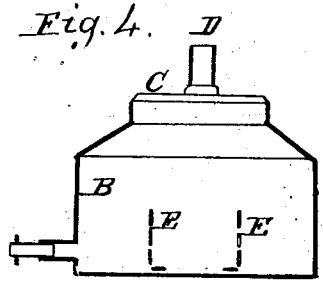
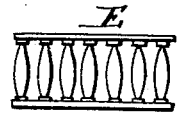

UNITED STATES PATENT OFFICE.

ENOCH THOMAS, OF HARRISONBURG, VIRGINIA.

ROCKING CHURN.

Specification of Letters Patent No. 753, dated May 30, 1838.

*To all whom it may concern:*

Be it known that I, ENOCH THOMAS, of Harrisonburg, in the county of Rockingham and State of Virginia, have invented a new and useful Improvement in Churns for Producing Butter in a Short Time, which is described as follows, reference being had to the annexed drawings of the same, making part of this specification.

The nature of my invention consists in constructing a stool, with four legs resting on rockers. Upon this rocking stool I fasten a rectangular or curved churn, made of tin or wood, of any convenient size, with a lid to take off or put on with ease, having in the center of said lid a tube for the free admission of atmospheric air to the inside of the churn, during the operation of churning; or the lid may be left off for this purpose. Two dashers perforated with holes, or (if the churn be small, one dasher only may suffice) made in the form of a balustrade, are placed inside the churn in grooves in the side thereof and which move with it, and may be taken out when the churn is to be emptied and cleansed.

A represents the rocking stool; B, the churn; C, the lid; D, aperture in the lid; E, dashers.

To produce butter with this churn the lid is removed and the cream put in, and the lid either replaced or left off. A small child or adult may then rock the churn as an amusement, and the butter will be quickly produced. The dashers are then taken out and the butter removed.

Wire gauze may be put over the opening to keep out flies in warm weather.

Among the many advantages which my churn possesses over others is, that it gathers the butter sooner and more easily than any other churn. This cannot be done, however, so well with dashers immovable. They must be taken out in order to collect the butter and one inserted in the middle. The butter is gathered immediately by taking both dashers out when the butter is well broken and inserting one in the center of the churn and gently agitating the cream by rocking slowly, or one dasher only may be used for the whole operation. Another advantage is that this churn is more easily cleaned than any other. All that is necessary is to pour off the buttermilk, throw in some water and rinse it about.

This churn can also be made so cheap that no objection can be made to it on account of the price. It can be furnished for the same price as other churns.

The method of ventilation may be differently modified. The top of the churn may be flat and the whole opening covered with wire gauze. There is no danger of splashing out at the top during the operation of churning if the least care be taken.

The invention claimed by me the said ENOCH THOMAS and which I desire to secure by Letters Patent consists of the gauze covering.

ENOCH THOMAS.

Witnesses:
RICHARD P. FLETCHER,
ELI HARRY.